(12) United States Patent
Vemuri et al.

(10) Patent No.: US 12,137,142 B2
(45) Date of Patent: Nov. 5, 2024

(54) SYSTEM AND METHOD FOR OPTIMIZING NETWORK CONNECTION IN A VEHICLE

(71) Applicant: GM GLOBAL TECHNOLOGY OPERATIONS LLC, Detroit, MI (US)

(72) Inventors: Venkata Naga Siva Vikas Vemuri, Farmington Hills, MI (US); Scott T. Droste, West Bloomfield, MI (US); Yu-Kung Ke, Shelby Township, MI (US); Andrew J. MacDonald, Grosse Pointe Park, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 158 days.

(21) Appl. No.: 17/965,078

(22) Filed: Oct. 13, 2022

(65) Prior Publication Data

US 2024/0129366 A1    Apr. 18, 2024

(51) Int. Cl.
*H04L 12/70*    (2013.01)
*H04L 67/12*    (2022.01)
*H04L 67/562*    (2022.01)
*H04W 76/19*    (2018.01)

(52) U.S. Cl.
CPC ............ *H04L 67/12* (2013.01); *H04L 67/562* (2022.05); *H04W 76/19* (2018.02)

(58) Field of Classification Search
CPC ....... H04L 67/12; H04L 67/562; H04W 76/19
USPC .......................................................... 709/201
See application file for complete search history.

(56) References Cited

U.S. PATENT DOCUMENTS

| | | | |
|---|---|---|---|
| 2005/0114666 A1* | 5/2005 | Sudia | H04L 9/3236 713/175 |
| 2007/0100507 A1* | 5/2007 | Simon | H04W 48/18 701/1 |
| 2011/0158084 A1* | 6/2011 | Lei | H04W 76/19 370/225 |
| 2013/0100795 A1* | 4/2013 | Zhao | H04W 36/0016 370/216 |
| 2014/0294180 A1* | 10/2014 | Link, II | G08G 1/205 380/270 |
| 2015/0281374 A1* | 10/2015 | Petersen | H04L 67/12 709/223 |
| 2015/0288636 A1* | 10/2015 | Yalavarty | H04L 51/216 709/206 |

(Continued)

*Primary Examiner* — Ario Etienne
*Assistant Examiner* — Elizabeth Kassa
(74) *Attorney, Agent, or Firm* — Quinn IP Law

(57) ABSTRACT

A system for managing communication between a vehicle and a broker module includes a telematics unit connected to the vehicle. The telematics unit is configured to carry out wireless data communications according to a publish-subscribe messaging protocol. A command unit is in communication with the telematics unit, the command unit having a processor and tangible, non-transitory memory on which instructions are recorded. The telematics unit is configured to establish a network connection with the broker module. The command unit is adapted to create a dynamic retry delay process for the network connection by varying a connection retry delay time based on a plurality of failure categories and an operation mode of the vehicle. The plurality of failure categories each corresponds to a respective failure in the network connection.

15 Claims, 6 Drawing Sheets

(56) References Cited

U.S. PATENT DOCUMENTS

2018/0288814 A1\* 10/2018 Ayoub .................. H04L 69/327
2021/0067353 A1\* 3/2021 Rannow ................ H04L 9/3213

\* cited by examiner

SYSTEM AND METHOD FOR OPTIMIZING NETWORK CONNECTION IN A VEHICLE

The present disclosure relates generally to a system and method for managing communication between a vehicle and a broker module. More specifically, the present disclosure relates to optimizing the network connection of a vehicle employing a publish-subscribe messaging protocol. The ever-increasing complexity of devices, including but not limited to vehicles, has led to an increase in information sharing between various entities. For example, a vehicle may provide information regarding the vehicle state, condition and operations performed, etc., to a remote assistance unit or vehicle services back office, with the information being stored in a database. Given that vehicles may be scattered across remote locations and have communication devices with resource constraints or limited network bandwidth, it is challenging for a vehicle to maintain the network connection, particularly during times of high usage.

SUMMARY

Disclosed herein is a system for managing communication between a vehicle and a broker module. The system includes a telematics unit connected to the vehicle. The telematics unit is configured to carry out wireless data communications according to a publish-subscribe messaging protocol. A command unit is in communication with the telematics unit, the command unit having a processor and tangible, non-transitory memory on which instructions are recorded. The telematics unit is configured to establish a network connection with the broker module. The command unit is adapted to create a dynamic retry delay process for the network connection by varying a connection retry delay time based on a plurality of failure categories and an operation mode of the vehicle. The plurality of failure categories each corresponds to a respective failure in the network connection.

The publish-subscribe messaging protocol may include Message Queue Telemetry Transport (MQTT). The plurality of failure categories may include a hardware failure category, a data-link failure category, an internet failure category, a transport failure category and an application failure category. The vehicle is adapted to send vehicle information to a remote assistance unit via a broker module, the remote assistance unit interfacing with the broker module.

When the respective failure is temporary and the vehicle is in an OFF mode, the command unit may be adapted to wait for the connection retry delay time between each failed connection. The command unit may be adapted to, when the respective failure is temporary and the vehicle is in an ON mode, continue retrying without the connection retry delay time.

When the respective failure is permanent, the command unit may be adapted to increase the connection retry delay time by a delta factor between each failed connection after a first retry. The command unit may be adapted to set the connection retry delay time to be a predefined first value when the broker module is unresponsive. When the broker module is responsive, and a transmission/internet control protocol (TCP/IP) set up was successful, the command unit may be adapted to determine if an authentication process is successful.

The command unit may be adapted to set the connection retry delay time to be half of the predefined first value when the broker module is responsive, but the transmission/internet control protocol (TCP/IP) set up was not successful.

When the authentication process is a failure due to an invalid certificate, the command unit may be adapted to switch to a public mode and retry the network connection without the connection retry delay time. When the authentication process is a failure but not due to an invalid certificate, the command unit may be adapted to close the network connection and initiate a new connection.

When the vehicle is in an OFF mode and a time duration in the OFF mode exceeds a predefined time limit, the command unit may be adapted to set the telematics unit to a low power mode. When the vehicle is in the OFF mode and the time duration does not exceed the predefined time limit, the command unit may be adapted to calculate the connection retry delay time based on the plurality of failure categories.

When the network connection is disconnected and the vehicle is in an OFF mode, the command unit may be adapted to set the connection retry delay time for a new session based on the plurality of failure categories. When the network connection is disconnected and the vehicle is in the ON mode, the command unit may be adapted to set the connection retry delay time to be a predefined initial delay. If the connection retry delay time is greater than a predefined maximum session delay, the command unit may be adapted to reset the connection retry delay time to be equal to the predefined maximum session delay. The command unit may be adapted to update the connection retry delay time to be twice of a previously defined delay when the vehicle is in the ON mode.

Disclosed herein is a method of managing communication between a vehicle and a broker module. The method includes installing a telematics unit in the vehicle and configuring the telematics unit to carry out wireless data communications according to a publish-subscribe messaging protocol. The method includes communicating with a command unit via the telematics unit, the command unit having a processor and tangible, non-transitory memory on which instructions are recorded. The telematics unit is configured to establish a network connection with the broker module. The method includes creating a dynamic retry delay process for the network connection by varying a connection retry delay time based on a plurality of failure categories and an operation mode of the vehicle, via the command unit, the plurality of failure categories each corresponding to a respective failure in the network connection.

The above features and advantages and other features and advantages of the present disclosure are readily apparent from the following detailed description of the best modes for carrying out the disclosure when taken in connection with the accompanying drawings.

Figure 1:
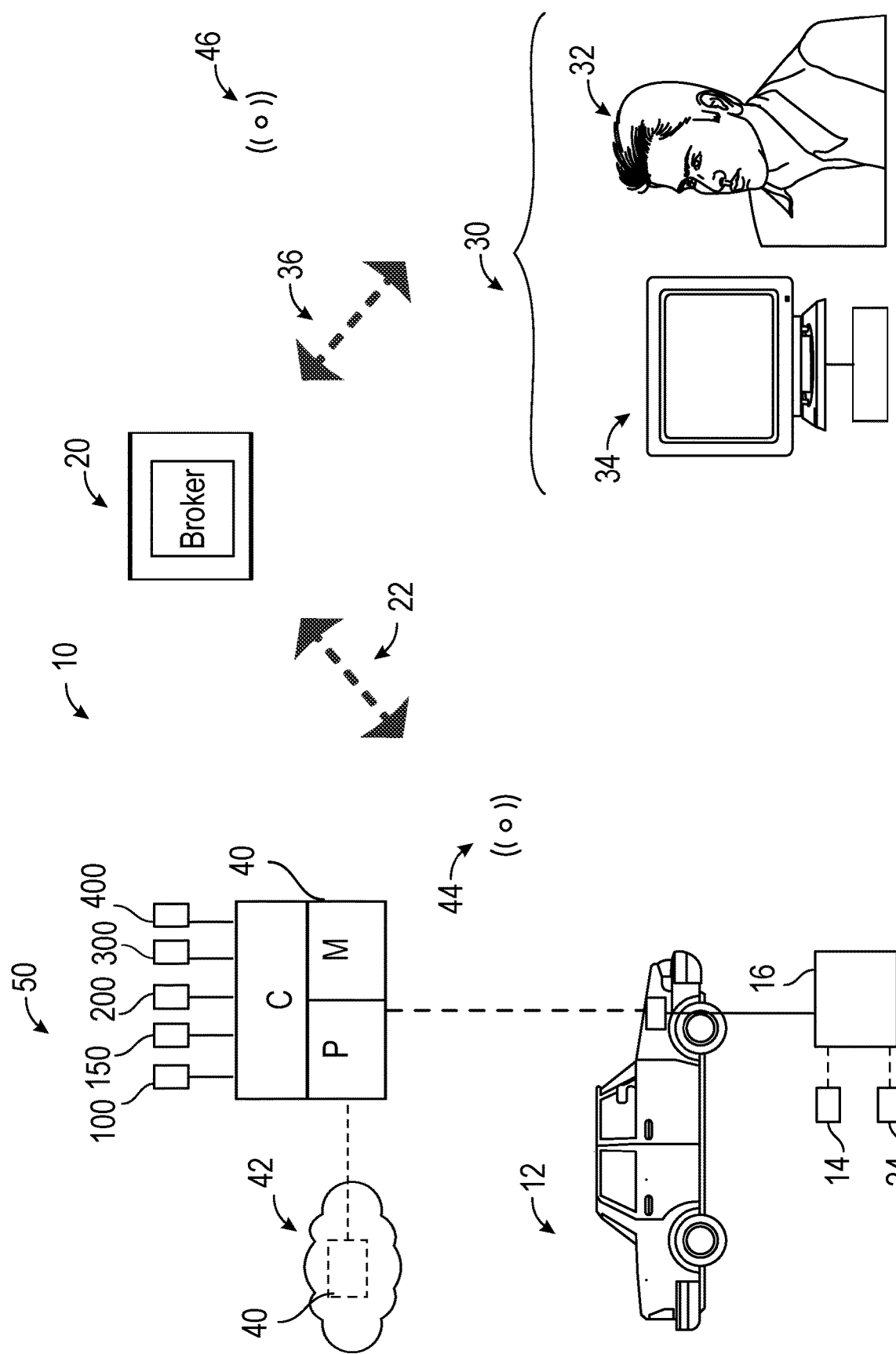
FIG. 1 is a schematic fragmentary diagram of a system for managing communication to and from a vehicle, the system having a command unit.

Representative embodiments of this disclosure are shown by way of non-limiting example in the drawings and are described in additional detail below. It should be understood, however, that the novel aspects of this disclosure are not limited to the particular forms illustrated in the above-enumerated drawings. Rather, the disclosure is to cover modifications, equivalents, combinations, sub-combinations, permutations, groupings, and alternatives falling within the scope of this disclosure as encompassed, for instance, by the appended claims.

DETAILED DESCRIPTION

Referring to the drawings, wherein like reference numbers refer to like components, FIG. 1 schematically illustrates a system 10 for managing communications in a vehicle 12 having a telematics unit 14. The vehicle 12 may include, but is not limited to, a passenger vehicle, sport utility vehicle, light truck, heavy duty vehicle, minivan, bus, transit vehicle, bicycle, moving robot, farm implement (e.g., tractor), sports-related equipment (e.g., golf cart), boat, plane, train or another moving platform. The vehicle 12 may be an electric vehicle, which may be purely electric or hybrid/partially electric. It is to be understood that the vehicle 12 may take many different forms and have additional components.

Referring to FIG. 1, the vehicle 12 includes a communications device, referred to herein as a telematics unit 14, that is capable of carrying out wireless data communications. The telematics unit 14 is accessible to a vehicle controller 16. The telematics unit 14 may collect data pertaining to the vehicle 12, such as location, speed, engine data, maintenance requirements and servicing, by interfacing with various internal sub-systems. The telematics unit 14 may enable vehicle-to-vehicle (V2V) communication and/or a vehicle-to-everything (V2X) communication.

Using the telematics unit 14, the vehicle 12 may establish a network connection 22 with a broker module 20, in accordance with a publish-subscribe messaging protocol. In the embodiment shown, the publish-subscribe messaging protocol is Message Queue Telemetry Transport (MQTT). The term "MQTT" includes variations and updates of MQTT. MQTT is a bi-directional communication protocol that allows the client devices and server application to become decoupled. The publish-subscribe messaging protocol may use an encryption model with certificate, username and password protected connections. The publish-subscribe messaging protocol may use other types of encryption and may require certification, e.g., in the form of a certificate file. In some embodiments, the vehicle 12 may communicate with the broker module 20 through a mobile device 24.

The broker module 20 may be connected to various clients, authenticating and authorizing the various clients. The broker module 20 acts as a post office for the clients of the publish-subscribe messaging protocol. In other words, the clients may employ the broker module 20 for sending and receiving messages, thus bypassing the establishment of connections between their respective client devices. Thus, each time a client desires to send information to another client device, such as from the vehicle 12 to a remote assistance unit 30 (shown in FIG. 1), a new connection does not have to be executed with additional authentication and authorization steps.

The remote assistance unit 30 may be manned electronically and/or by a remote advisor 32 having access to an electronic device 34 such as a desktop computer, laptop, tablet, cell phone or wearable device. In some embodiments, the remote assistance unit 30 is an OnStar calling/resource center. The remote assistance unit 30 may include one or more servers that each include a processing device and a memory device and at least one database that includes vehicle information. The remote assistance unit 30 may form a separate connection 36 to communicate with the broker module 20.

Referring to FIG. 1, the network connection 22 (e.g., MQTT) may be initiated through a connection request message sent from the vehicle 12 to the broker module 20, using the publish-subscribe messaging protocol. The broker module 20 may include a client library that handles sending and receiving connection requests. However, network connection 22 may be lost for various reasons. As described below, the system 10 deploys intelligent ways to reacquire the network connection 22 from the broker module 20 based on identifying the reason of failure that prevented the session creation and/or caused connection failure.

The broker module 20 sends a connection acknowledgement message indicating that the established connection is successful. A publish message is generated at the vehicle 12 and sent to the broker module 20. For example, the publish message may include vehicle information/data. Each client may generate and receive data by both publishing and subscribing. Multiple clients may subscribe to a topic from a single broker, and a single client may register subscriptions to topics with multiple brokers.

The broker module 20 may be configured in various ways, which may be on-premises or in the cloud and may be self-built or hosted by a third party. The broker module 20 may be hosted solely by a single cloud unit or divided into multiple sub modules hosted at multiple locations. The broker module 20 includes a memory to store instructions and a processor to carry out various instructions. The broker module 20 may support both standard MQTT and enhanced or specific MQTT for compliant specifications.

Referring to FIG. 1, the system 10 includes a command unit 40 having an integrated controller C with at least one processor P and at least one memory M (or non-transitory, tangible computer readable medium) on which instructions may be recorded for selectively executing one or more modules 50 for managing the connections of the vehicle 12. The modules 50 include a First Retry Module 100, a Second Retry Module 150, a Back-off Delay Module 200, a Delay Creation Module 300 and a Session Maintenance Module 400, which are described below with respect to FIGS. 2-6, respectively.

Through execution of the modules 50, the command unit 40 is adapted to create a dynamic retry delay process for the network connection 22 by varying a connection retry delay time based on a plurality of failure categories and an operation mode of the vehicle 12. The categories of failure embody a multi-layer approach that optimizes reconnection and back-off delay times. The First Retry Module 100 and the Second Retry Module 150 are employed to optimize reconnection based on the operating mode of the vehicle 12. For example, the retry is aggressively pursued for temporary failures in the ON mode, whereas connection failures in the OFF mode follow a power-conscious approach. The ON mode refers to an ignition ON mode while the OFF mode refers to an ignition OFF mode of the vehicle 12.

The Back-off Delay Module 200 is employed to eliminate repeated attempts to connect to the broker module 20 upon failure. The Delay Creation Module 300 computes the amount of time for waiting between failed connection attempts to reestablish the network connection 22 of the vehicle 12 to the broker module 20. The Session Maintenance Module 400 depicts the activities that are performed to ensure a persistent network connection 22 is maintained. The modules 50 of FIG. 1 may be executed for the vehicle 12 individually or for a group of vehicles.

Each of the modules 50 may be embodied as computer-readable code or instructions stored on and partially executable by the command unit 40 of FIG. 1. It is understood that the modules 50 are independent of one another. The modules 50 may be consecutively or concurrently executed by the command unit 40. The memory M may store controller-executable instruction sets, and the processor P may execute the controller-executable instruction sets stored in the memory M.

The command unit 40 may be hosted or based out of a remotely located cloud computing service 42, shown in FIG. 1. The cloud computing service 42 may include one or more remote servers hosted on the Internet to store, manage, and process data. The cloud computing service 42 may be at least partially managed by personnel at various locations. Alternatively, the command unit 40 may be embedded in the vehicle controller 16. If the vehicle 12 is part of a fleet, the command unit 40 may be embedded in a master or leader vehicle.

Referring to FIG. 1, the system 10 may employ one or more wireless networks, such as wireless carrier 44 and wireless carrier 46, usable by the vehicle 12, the broker module 20 and the remote assistance unit 30. The wireless network may be a short-range network or a long-range network. The wireless network may be a serial communication bus in the form of a local area network. The local area network may include, but is not limited to, a Command unit Area Network (MAY), a Command unit Area Network with Flexible Data Rate (MAY-FD), Ethernet, Bluetooth, WIFI and other forms of data.

The wireless network may be a Wireless Local Area Network (LAN) which links multiple devices using a wireless distribution method, a Wireless Metropolitan Area Network (MAN) which connects several wireless LANs or a Wireless Wide Area Network (WAN) which covers large areas such as neighboring towns and cities. Other types of network technologies or carrier systems available to those skilled in the art may be employed.

Figure 2:
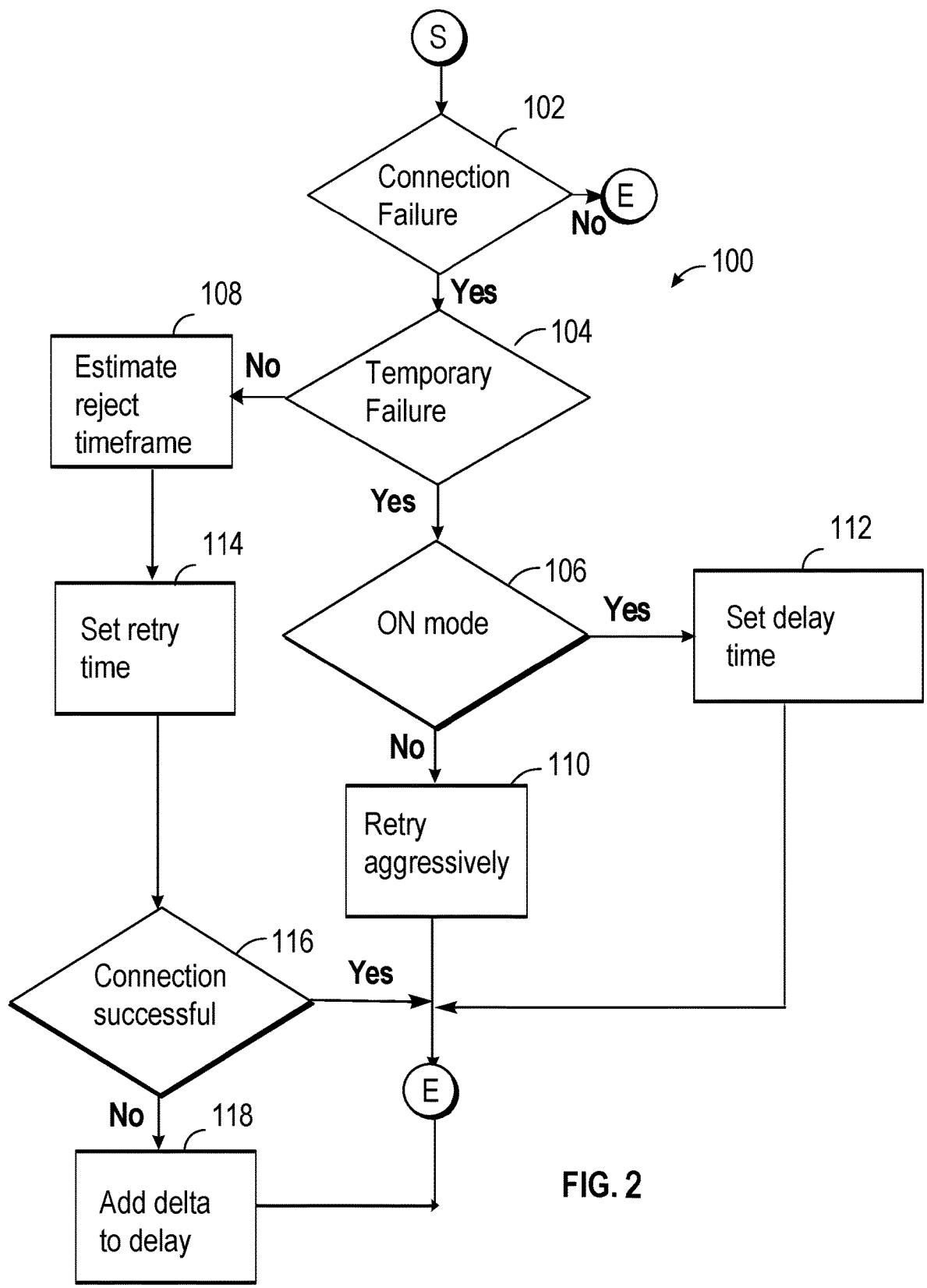
FIG. 2 is a flowchart for a first module executable by the command unit of FIG. 1.

Referring now to FIG. 2, an example flowchart of the First Retry Module 100 is shown. The First Retry Module 100 may be dynamically executed and need not be applied in the specific order recited herein. Furthermore, it is to be understood that some steps may be eliminated.

Per block 102, the command unit 40 is programmed to determine whether the connection failure is true. If there is a connection failure (block 102=YES), the Module 100 proceeds to block 104 where the command unit 40 is adapted to determine whether the class of failure is temporary. If there is no connection failure (block 102=NO), the Module 100 is ended. If the class of failure is temporary (block 104=YES), the Module 100 proceeds to block 106 to determine whether the vehicle 12 is in an OFF mode. If the class of failure is permanent (block 104=NO), the Module 100 proceeds to block 108 to estimate the connection retry delay time based on the type of failure.

The plurality of failure categories is defined by respective failures in the network connection 22. In one embodiment, there are five failure categories: a hardware failure category, a data-link failure category, an internet failure category, a transport failure category and an application failure category. It is understood that alternative failure categories may be defined. Each failure category may have a unique connection retry delay time associated with it.

The class of failure may be placed in two significant categories: permanent and temporary failure classes. A permanent failure is one that may not be resolved in the form it was originally. A temporary failure is one that may be remedied, is regarded as valid in its initial state but a persistent temporary condition has caused delay. For example, there may be 'N' number of temporary and permanent failure wait times that may be employed in this smart retry mechanism.

If the vehicle 12 is in an OFF mode (block 106=YES), the Module 100 proceeds to block 112, where the command unit 40 is adapted to wait for the predefined time between every failed connection until successful. If whether the vehicle 12 is in an ON mode (block 106=NO), the Module 100 proceeds to block 110 to retry aggressively without a delay until a successful connection is created. The ON mode refers to an ignition ON mode while the OFF mode refers to an ignition OFF mode of the vehicle 12.

Advancing from block 108 to block 114, the command unit 40 is adapted to set the connection retry delay time based on the category of failure. Proceeding from block 114 to block 116, the command unit 40 is adapted to determine if the connection is successful. If so (block 116=YES), the Module 100 is ended. If not (block 116=NO), the Module 100 proceeds to block 118 to add a delta factor (A) to the connection retry delay time for each failure after the first connection failure and continue retrying until successful. Module 100 is ended after block 110, 112 and 118.

Figure 3:
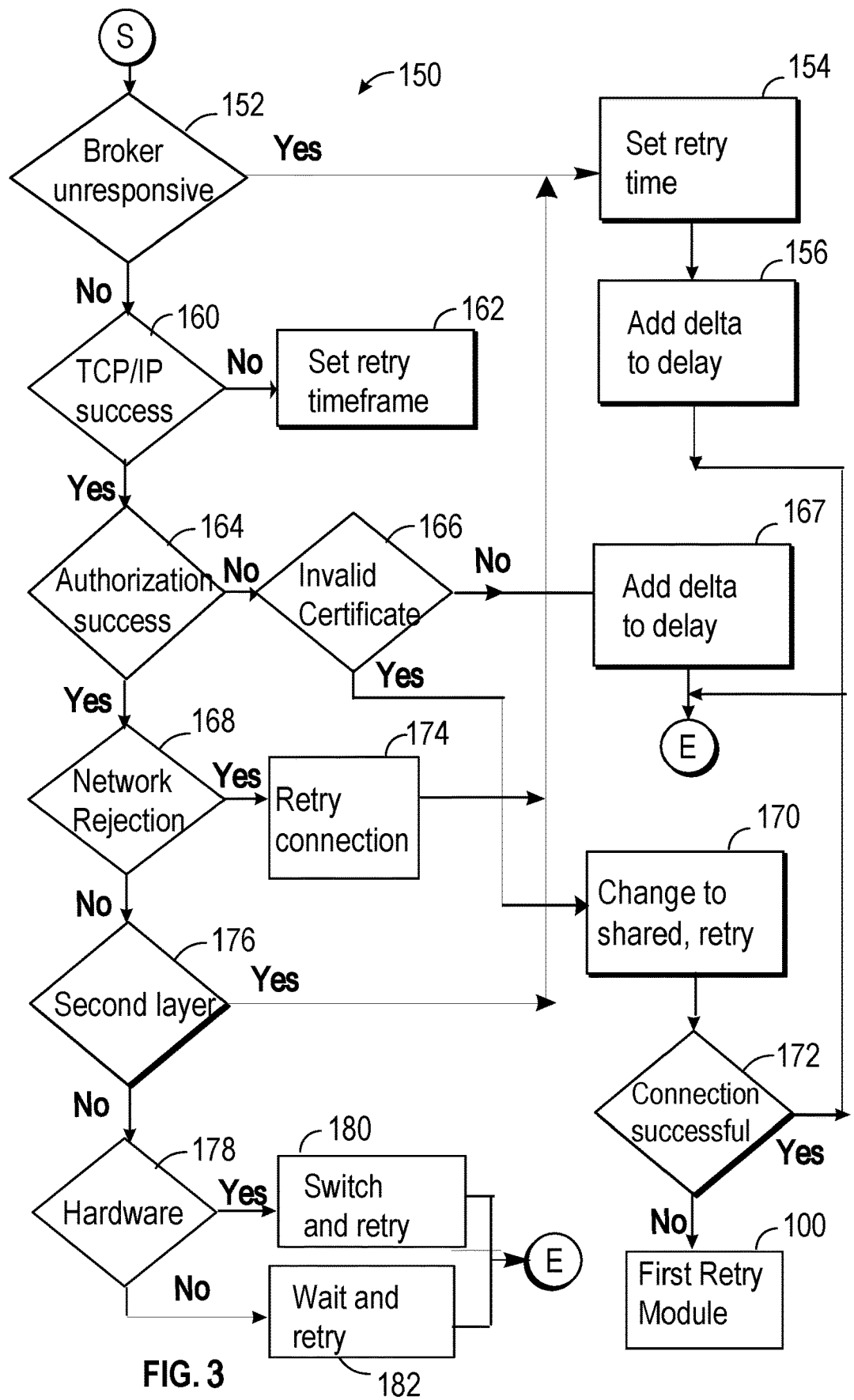
FIG. 3 is a flowchart for a second module executable by the command unit of FIG. 1.

Referring now to FIG. 3, an example flowchart of the Second Retry Module 150 is shown. The Second Retry Module 150 may be dynamically executed and need not be applied in the specific order recited herein. Furthermore, it is to be understood that some steps may be eliminated.

Per block 152 of FIG. 3, the command unit 40 is programmed to determine if the broker module 20 is unresponsive. If the broker module 20 is unresponsive (block 152=YES), Module 150 advances to block 154 where the command unit 40 sets the connection retry delay time to be a predefined first value (T). From block 154, the Module 150 proceeds to block 156 to confirm that the network connection 22 is successful and if not, to add a delta factor to the connection retry delay time.

If the broker module 20 is responsive (block 152=NO), Module 150 advances to block 160 to determine if the TCP/IP set up was successful. The current protocols used on the Internet (and similar networks) are the Transmission Control Protocol and the Internet Protocol (TCP/IP). Each host that is involved in a communication transaction runs a unique implementation of the protocol stack.

If the TCP/IP set up was not successful (block 160=NO), Module 150 advances to block 162 to reset the connection retry delay time to be T/2 or half the predefined first value. If the TCP/IP set up was successful (block 160=YES), Module 150 advances to block 164 to determine if an authentication process (e.g., TLS) was a success.

If the authentication process was not a success (block 164=NO), Module 150 advances to block 166 to determine if the authentication failure was due to an invalid certificate. If the authentication process was a success (block 164=YES), Module 150 advances to block 168 to determine if the permanent layer of the network was rejected. If the authentication failure was not due to an invalid certificate (block 166=NO), Module 150 advances to block 167 to close TCP/IP/TLS connection and initiate a new network connection 22.

If the authentication failure was due to an invalid certificate (block 166=YES), Module 150 advances to block 170 to change to a shared or public mode of connection and retry the network connection 22 immediately. Proceeding from block 170 to block 172, Module 150 determines if the connection was successful.

If the permanent layer of the network was rejected (block 168=YES), Module 150 advances to block 174 to wait until the reject timer expires before making another connection attempt and looping back to block 154. If the permanent layer of the network was not rejected (block 168=NO), Module 150 advances to block 176 to determine if there was a different layer of failure issue, such as a second layer issue.

If there is a second layer issue (block 176=YES), Module 150 loops back to block 154. If there is no second layer issue (block 176=NO), Module 150 advances to block 178 to determine if there is a first layer (i.e., hardware) issue. If there is a first layer (i.e., hardware) issue (block 178=YES), Module 150 advances to block 180 to switch hardware to an internal antenna and immediately retry. If there is no first layer (i.e., hardware) issue (block 178=NO), Module 150 advances to block 182 to designate this as a poor radio frequency issue, wait for a few seconds and retry.

Figure 4:
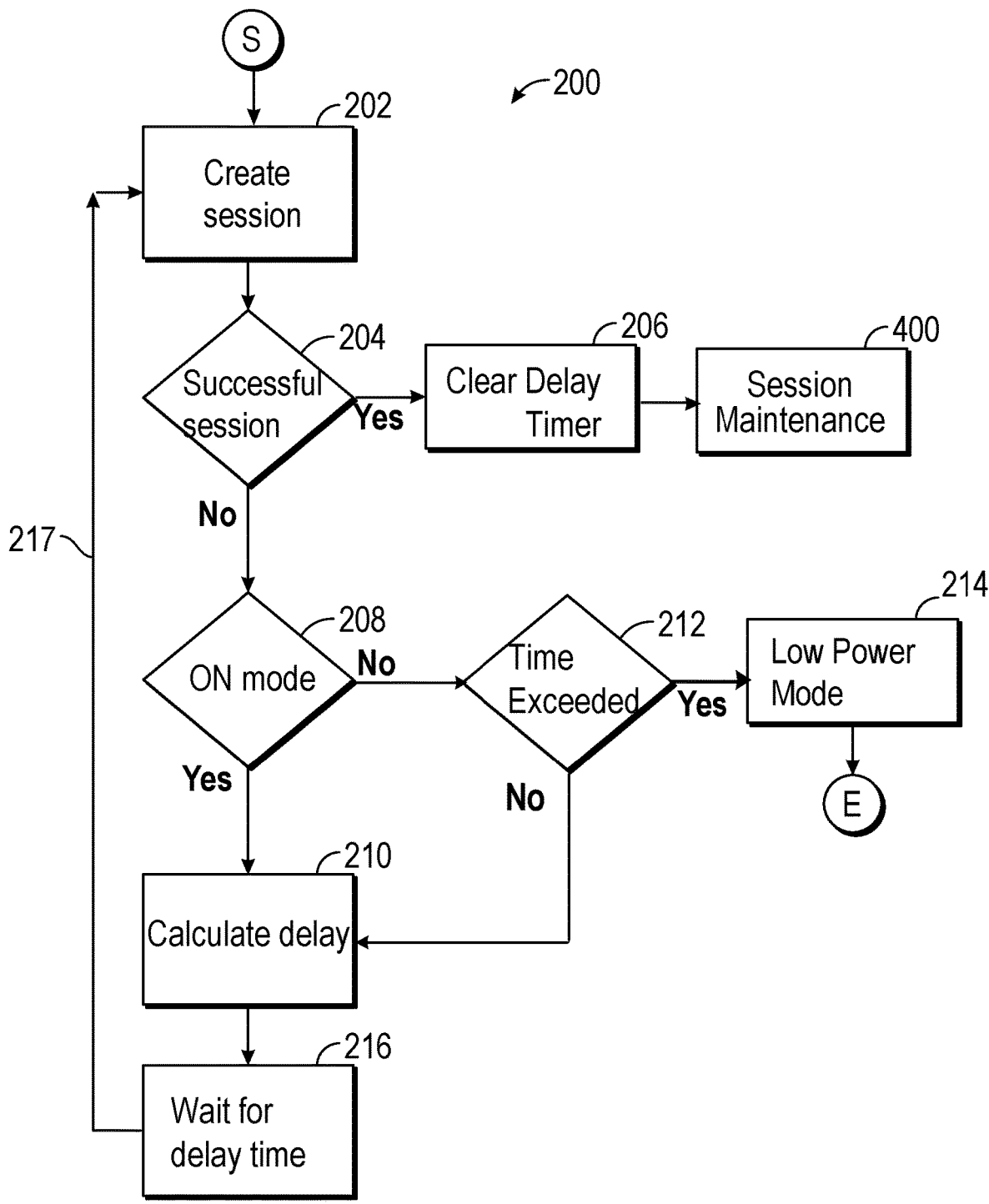
FIG. 4 is a flowchart for a third module executable by the command unit of FIG. 1.

Referring now to FIG. 4, an example flowchart of the Back-off Delay Module 200 is shown. The Back-off Delay Module 200 may be dynamically executed and need not be applied in the specific order recited herein. Furthermore, it is to be understood that some steps may be eliminated.

Per block 202 of FIG. 4, the command unit 40 is programmed to create a session (e.g., MQTT connection). Advancing to block 204, the command unit 40 is adapted to determine if the session was created successfully. If so (block 204=YES), Module 200 advances to block 206 where the command unit 40 clears the delay timer (sets the connection retry delay time to zero). From block 206, Module 200 proceeds to Module 400 for the session maintenance process.

If the session was not successfully created (block 204=NO), Module 200 advances to block 208 where the command unit 40 determines if the vehicle 12 in an ON mode of operation. If the vehicle 12 is in an ON mode of operation (block 208=YES), Module 200 advances to block 210 where the command unit 40 calculates the connection retry delay time based on the class of failure. From block 210, Module 200 advances to block 216 to wait for the calculated delay time and loop back to block 202 (as indicated by line 217).

If the vehicle 12 in an OFF mode of operation (block 208=NO), Module 200 advances to block 212 where the command unit 40 determines if the duration in the OFF mode exceeds a predefined OFF time limit (e.g., 4 hours or 8 hours). If so (block 212=YES), the telematics unit 14 is moved to a low power mode per block 214 and Module 200 is ended. If the time duration does not exceed the predefined OFF time limit, Module 200 proceeds to block 210.

Figure 5:
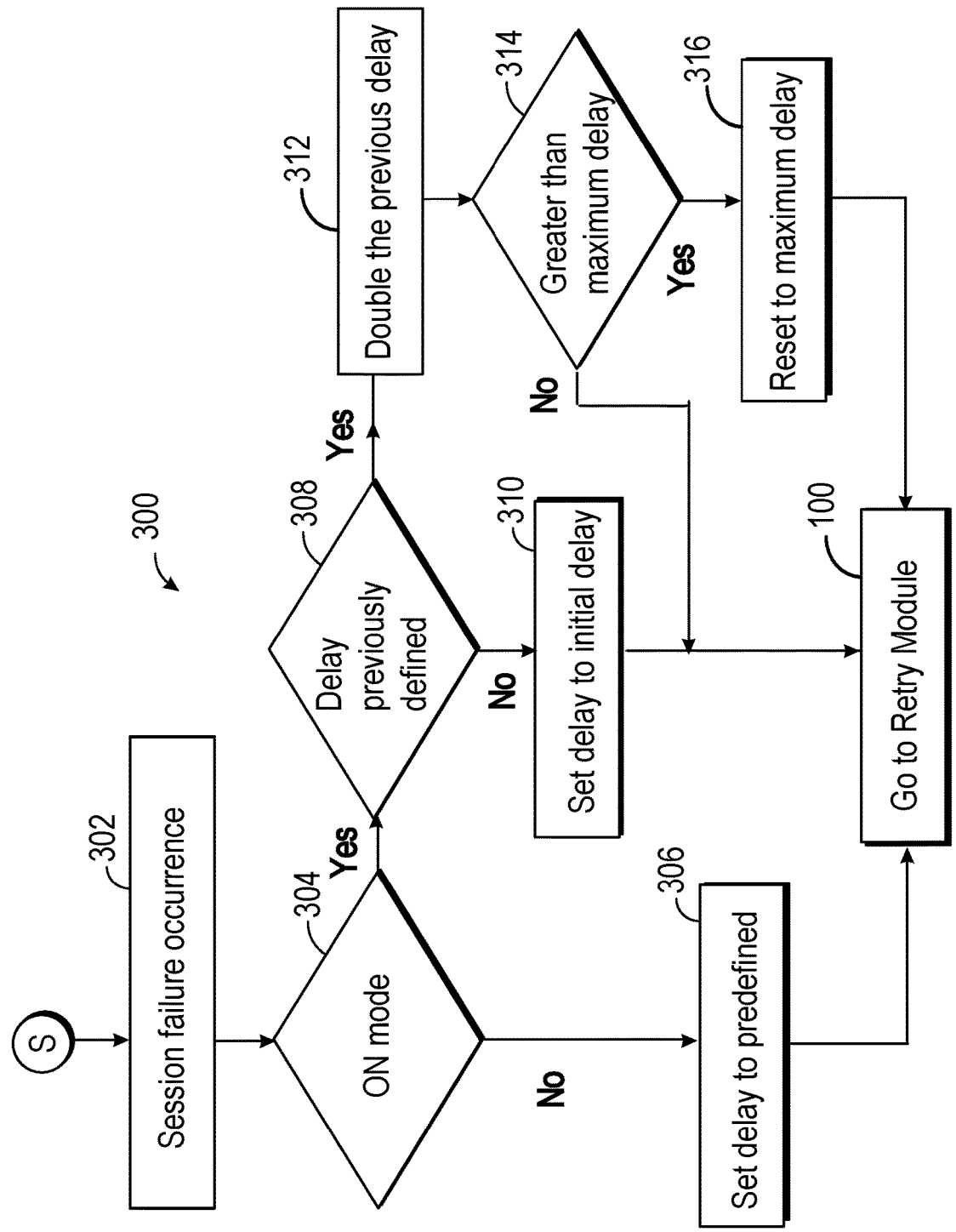
FIG. 5 is a flowchart for a fourth module executable by the command unit of FIG. 1.

Referring now to FIG. 5, an example flowchart of the Delay Creation Module 300 is shown. The Delay Creation Module 300 may be dynamically executed and need not be applied in the specific order recited herein. Furthermore, it is to be understood that some steps may be eliminated.

Per block 302 of FIG. 5, the command unit 40 is adapted to obtain details of the MQTT connection session failure occurrence. Advancing to block 304, the command unit 40 determines if the vehicle 12 is in an ON mode of operation. If the vehicle is not in the ON mode (block 304=NO), the Module 300 proceeds to block 306 where the delay for the session creation is set based on the class and the category of failure.

If the vehicle 12 is in the ON mode (block 304=YES), the Module 300 proceeds to block 308 where the command unit 40 determines if the delay was previously defined. If the delay was not previously defined (block 308=NO), the Module 300 proceeds to block 310 where the delay is set as a predefined initial session delay.

If the delay was previously defined (block 308=YES), the Module 300 proceeds to block 312, the delay is set to be twice the previously occurring delay. Advancing to block 314 from block 312, the command unit 40 determines if the delay is greater than a predefined maximum session delay ($d_{max}$). If so (block 314=YES), the Module 300 proceeds to block 316 where the delay is reset to be equal to the predefined maximum session delay ($d_{max}$). If the delay is less than or equal to the predefined maximum session delay (block 314=NO), Module 400 proceeds to execute Module 100. Also from blocks 306, 310, and 316, the Module 300 proceeds or returns to Module 100. In a non-limiting example, the predefined delay is 4 hours or 8 hours.

Figure 6:
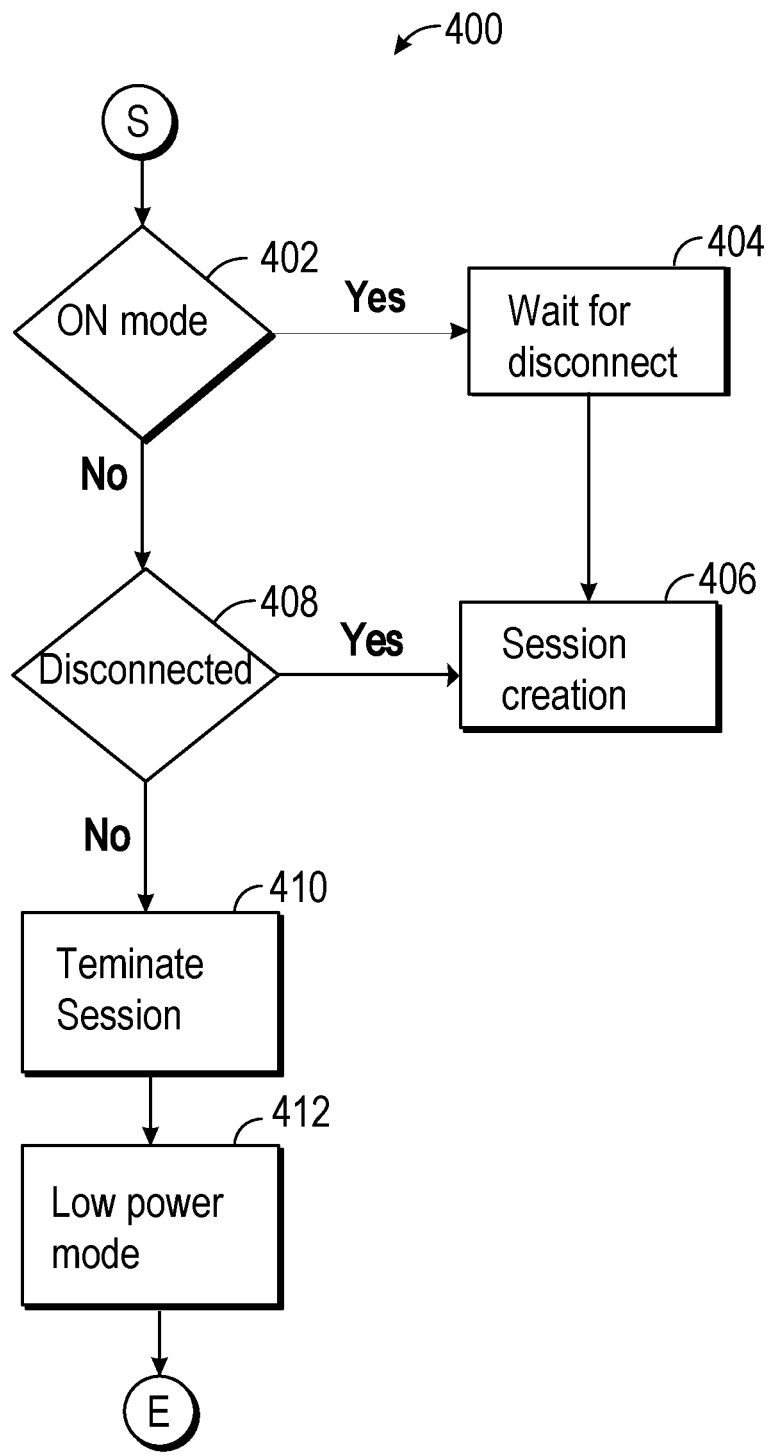
FIG. 6 is a flowchart for a fifth module executable by the command unit of FIG. 1.

Referring now to FIG. 6, an example flowchart of Session Maintenance Module 400 is shown. The Session Maintenance Module 400 may be dynamically executed and need not be applied in the specific order recited herein. Furthermore, it is to be understood that some steps may be eliminated.

Per block 402, the command unit 40 is adapted to determine whether to determine if the vehicle 12 is an ON mode of operation. If the vehicle 12 is in the ON mode (block 402=YES), the Module 400 proceeds to block 404 where the command unit 40 is adapted to wait for the session to disconnect from that particular socket. From block 404, the Module 400 advances to block 406 where a new session is created, and Module 400 is ended.

If the vehicle 12 is in the OFF mode (block 402=NO), the Module 400 proceeds to block 408 where the command unit 40 determines if the session was disconnected or the session time was exceeded. If the session was disconnected (block 408=YES), the Module 400 proceeds to block 406 where a new session is created, and Module 400 is ended.

If the session time was exceeded (block 408=NO), the Module 400 proceeds to block 410 where the command unit 40 is adapted to terminate the MQTT session. From block 410, the Module 400 advances to block 412 where the telematics unit 14 is entered into a low power mode (e.g., deep sleep mode) and Module 400 is ended. The receipt of the control packet may reset the response timer for the connection request from the telematics unit 14 (which makes the request).

In summary, the system 10 optimizes communications for motor vehicles and various other devices (e.g., smartphones, other mobile devices, servers, and/or an electronic computing device) that use a publish-subscribe messaging protocol through the use of a broker module 20. The system 10 provides a multi-layer extensive failure scenario approach that optimizes the network connection of the vehicle 12.

As used herein, the terms 'dynamic' and 'dynamically' describe steps or processes that are executed in real-time and are characterized by monitoring or otherwise determining states of parameters and regularly or periodically updating the states of the parameters during execution of a routine or between iterations of execution of the routine.

The command unit 40 of FIG. 1 includes a computer-readable medium (also referred to as a processor-readable medium), including a non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which may constitute a main memory. Such instructions may be transmitted by one or more transmission media, including coaxial cables, copper wire and fiber optics, including the wires that comprise a system bus coupled to a processor of a computer. Some forms of computer-readable media include, for example, a floppy disk, a flexible disk, hard disk, magnetic tape, other magnetic medium, a CD-ROM, DVD, other optical medium, a physical medium, a RAM, a PROM, an EPROM, a FLASH-EEPROM, other memory chip or cartridge, or other medium from which a computer may read.

Look-up tables, databases, data repositories or other data stores described herein may include various kinds of mechanisms for storing, accessing, and retrieving various kinds of data, including a hierarchical database, a set of files in a file system, an application database in a proprietary format, a relational database energy management system (RDBMS), etc. Each such data store may be included within a computing device employing a computer operating system such as one of those mentioned above and may be accessed via a network in one or more of a variety of manners. A file system may be accessible from a computer operating system and may include files stored in various formats. An RDBMS may employ the Structured Query Language (SQL) in addition to a language for creating, storing, editing, and executing stored procedures, such as the PL/SQL language mentioned above.

The flowcharts illustrate an architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by specific purpose hardware-based systems that perform the specified functions or acts, or combinations of specific purpose hardware and computer instructions. These computer program instructions may also be stored in a computer-readable medium that may direct a controller or other programmable data processing apparatus to function in a particular manner, such that the instructions stored in the computer-readable medium produce an article of manufacture including instructions to implement the function/act specified in the flowchart and/or block diagram blocks.

The numerical values of parameters (e.g., of quantities or conditions) in this specification, including the appended claims, are to be understood as being modified in each respective instance by the term "about" whether or not "about" actually appears before the numerical value. "About" indicates that the stated numerical value allows some slight imprecision (with some approach to exactness in the value; about or reasonably close to the value; nearly). If the imprecision provided by "about" is not otherwise understood in the art with this ordinary meaning, then "about" as used herein indicates at least variations that may arise from ordinary methods of measuring and using such parameters.

In addition, disclosure of ranges includes disclosure of each value and further divided ranges within the entire range. Each value within a range and the endpoints of a range are hereby disclosed as separate embodiments.

The detailed description and the drawings or FIGS. are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment may be combined with one or a plurality of other desired characteristics from other embodiments, resulting in other embodiments not described in words or by reference to the drawings. Accordingly, such other embodiments fall within the framework of the scope of the appended claims.

What is claimed is:

1. A system of managing communication between a vehicle and a broker module, the system comprising:
   a telematics unit connected to the vehicle and configured to carry out wireless data communications with the broker module according to a publish-subscribe messaging protocol, including establishing a Message Queue Telemetry Transport (MQTT) session with the broker module;
   a command unit in communication with the telematics unit, the command unit having a processor and tangible, non-transitory memory on which instructions are recorded;
   wherein the command unit is adapted to create a dynamic retry delay process when the MQTT session is disconnected by varying a connection retry delay time based on a plurality of failure categories and an operation mode of the vehicle, the plurality of failure categories each corresponding to a respective failure in the MQTT session;
   wherein when the respective failure in the MQTT session is a temporary failure and the vehicle is in an OFF mode for a time duration exceeding a predefined time limit, the command unit is adapted to set the telematics unit to a low power mode, the temporary failure being resolvable in an original form;
   wherein when the respective failure in the MQTT session is the temporary failure and the vehicle is in an ON mode, the command unit is adapted to reset the connection retry delay time between each failed connection, including:
      determining if the connection retry delay time was previously defined;
      when the connection retry delay time was not previously defined, setting the connection retry delay time to be a predefined initial delay;
      when the connection retry delay time was previously defined, updating the connection retry delay time to be twice of a previously defined delay; and
      when the connection retry delay time exceeds a predefined maximum session delay, updating the connection retry delay time to be equal to the predefined maximum session delay.

2. The system of claim 1, further comprising:
a remote assistance unit interfacing with the broker module, the vehicle being adapted to send vehicle information to the remote assistance unit via the broker module.

3. The system of claim 1, wherein the plurality of failure categories includes a hardware failure category, a data-link failure category, an internet failure category, a transport failure category and an application failure category.

4. The system of claim 1, wherein the command unit is adapted to:
when the respective failure is a permanent failure, increase the connection retry delay time by a delta factor between each failed connection after a first retry, the permanent failure being unresolvable in the original form.

5. The system of claim 1, wherein the command unit is adapted to:
set the connection retry delay time to be a predefined first value when the broker module is unresponsive; and
determine if an authentication process is successful when the broker module is responsive, and a transmission/internet control protocol (TCP/IP) set up was successful.

6. The system of claim 5, wherein the command unit is adapted to:
set the connection retry delay time to be half of the predefined first value when the broker module is responsive, but the transmission/internet control protocol (TCP/IP) set up was not successful.

7. The system of claim 5, wherein the command unit is adapted to:
switch to a public mode and retry the network connection without the connection retry delay time when the authentication process is a failure due to an invalid certificate; and
close the network connection and initiate a new connection when the authentication process is a failure but not due to an invalid certificate.

8. A method of managing communication between a vehicle and a broker module, the method comprising:
installing a telematics unit in the vehicle and configuring the telematics unit to carry out wireless data communications with the broker module according to a publish-subscribe messaging protocol, including establishing a Message Queue Telemetry Transport (MQTT) session with the broker module;
installing a command unit in the vehicle, the command unit having a processor and tangible, non-transitory memory on which instructions are recorded;
creating a dynamic retry delay process when the MQTT session is disconnected by varying a connection retry delay time based on a plurality of failure categories and an operation mode of the vehicle, via the command unit, the plurality of failure categories each corresponding to a respective failure in the MQTT session;
setting the telematics unit to a low power mode, via the command unit, when the respective failure in the MQTT session is a temporary failure and the vehicle is in an OFF mode for a time duration exceeding a predefined time limit, the temporary failure being resolvable in an original form;
resetting the connection retry delay time between each failed connection when the respective failure in the MQTT session is the temporary failure and the vehicle is in an ON mode, including:
determining if the connection retry delay time was previously defined;
when the connection retry delay time was not previously defined, setting the connection retry delay time to be a predefined initial delay;
when the connection retry delay time was previously defined, updating the connection retry delay time to be twice of a previously defined delay; and
when the connection retry delay time exceeds a predefined maximum session delay, updating the connection retry delay time to be equal to the predefined maximum session delay.

9. The method of claim 8, further comprising: (Original) setting the plurality of failure categories to include a hardware failure category, a data-link failure category, an internet failure category, a transport failure category and an application failure category.

10. The method of claim 8, further comprising:
increasing the connection retry delay time by a delta factor between each failed connection after a first retry when the respective failure is a permanent failure, the permanent failure being unresolvable in the original form.

11. The method of claim 8, further comprising:
setting the connection retry delay time to be a predefined first value when the broker module is unresponsive;
determining if an authentication process is successful when the broker module is responsive, and a transmission/internet control protocol (TCP/IP) set up was successful; and
setting the connection retry delay time to be half of the predefined first value when the broker module is responsive, but the transmission/internet control protocol (TCP/IP) set up was not successful.

12. A vehicle comprising:
a vehicle controller embedded with a command unit having a processor and tangible, non-transitory memory on which instructions are recorded;
a telematics unit in communication with the command unit and configured to carry out wireless data communications with a broker module according to a publish-subscribe messaging protocol, including establishing a Message Queue Telemetry Transport (MQTT) session with the broker module;
wherein the command unit is adapted to create a dynamic retry delay process when the MQTT session is disconnected by varying a connection retry delay time based on a plurality of failure categories and an operation mode of the vehicle, the plurality of failure categories each corresponding to a respective failure in the MQTT session;
wherein when the respective failure in the MQTT session is a temporary failure and the vehicle is in an OFF mode for a time duration exceeding a predefined time limit, the command unit is adapted to set the telematics unit to a low power mode, the temporary failure being resolvable in an original form;
wherein when the respective failure in the MQTT session is the temporary failure and the vehicle is in an ON mode, the command unit is adapted to determine the connection retry delay time between each failed connection, including:
determining if the connection retry delay time was previously defined;
when the connection retry delay time was not previously defined, setting the connection retry delay time to be a predefined initial delay;

when the connection retry delay time was previously defined, updating the connection retry delay time to be twice of a previously defined delay; and when the connection retry delay time exceeds a predefined maximum session delay, resetting the connection retry delay time to be equal to the predefined maximum session delay.

13. The vehicle of claim 12, wherein the command unit is adapted to:

set the connection retry delay time to be a predefined first value when the broker module is unresponsive; and determine if an authentication process is successful when the broker module is responsive, and a transmission/internet control protocol (TCP/IP) set up was successful.

14. The vehicle of claim 13, wherein the command unit is adapted to:

set the connection retry delay time to be half of the predefined first value when the broker module is responsive, but the transmission/internet control protocol (TCP/IP) set up was not successful.

15. The vehicle of claim 13, wherein the command unit is adapted to:

switch to a public mode and retry the network connection without the connection retry delay time when the authentication process is a failure due to an invalid certificate; and close the network connection and initiate a new connection when the authentication process is a failure but not due to an invalid certificate.

* * * * *